(12) United States Patent
Youn et al.

(10) Patent No.: US 11,720,247 B2
(45) Date of Patent: Aug. 8, 2023

(54) FOLDABLE DISPLAY DEVICE PROVIDING VIRTUAL KEYBOARD AND METHOD OF DRIVING THE SAME

(71) Applicant: Samsung Display Co., Ltd., Yongin-si (KR)

(72) Inventors: Juae Youn, Seoul (KR); Minsoo Kim, Seoul (KR); Seung-Lyong Bok, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/736,453

(22) Filed: May 4, 2022

(65) Prior Publication Data
US 2022/0413694 A1      Dec. 29, 2022

(30) Foreign Application Priority Data
Jun. 28, 2021   (KR) .......................... 10-2021-0083777

(51) Int. Cl.
| | |
|---|---|
| *G06F 3/04886* | (2022.01) |
| *G06F 1/16* | (2006.01) |
| *G06F 3/023* | (2006.01) |
| *G06F 3/041* | (2006.01) |

(52) U.S. Cl.
CPC ........ *G06F 3/04886* (2013.01); *G06F 1/1616* (2013.01); *G06F 1/1643* (2013.01); *G06F 1/1673* (2013.01); *G06F 3/0237* (2013.01); *G06F 3/0418* (2013.01)

(58) Field of Classification Search
CPC .. G06F 3/04886; G06F 1/1616; G06F 1/1643; G06F 1/1673; G06F 3/0237; G06F 3/0418
See application file for complete search history.

(56) References Cited

U.S. PATENT DOCUMENTS

| | | | |
|---|---|---|---|
| 8,811,032 B2 | 8/2014 | Ladouceur et al. | |
| 9,965,179 B2 | 5/2018 | Bozzini et al. | |
| 11,137,894 B1 * | 10/2021 | Chen | ..................... G06F 1/1643 |
| 2009/0160761 A1 * | 6/2009 | Moosavi | ............... G06F 3/0237 |
| | | | 341/20 |

(Continued)

FOREIGN PATENT DOCUMENTS

| | | |
|---|---|---|
| KR | 102079985 B1 | 2/2020 |
| KR | 102209076 B1 | 1/2021 |

*Primary Examiner* — Afroza Chowdhury
(74) *Attorney, Agent, or Firm* — Cantor Colburn LLP

(57) ABSTRACT

A foldable display device includes: a foldable display panel including a folding line, a first display area, and a second display area which displays a virtual keyboard including virtual keys in a keyboard mode; a touch panel including touch electrodes for receiving a touch input; a data driver which outputs a data voltage to the foldable display panel; a driving controller which controls the data driver; and a touch data generator which generates touch data based on the touch input, determines at least two input key values of the input key values as a typographical error when the at least two input key values are simultaneously input, and outputs the touch data including the at least two input key values determined as the typographical error to the driving controller. The driving controller activates a typographical error notification function and a typographical error correction function based on the touch data.

18 Claims, 9 Drawing Sheets

(56) References Cited

U.S. PATENT DOCUMENTS

| | | | |
|---|---|---|---|
| 2016/0110097 A1* | 4/2016 | Cho | G06F 3/0238 |
| | | | 345/178 |
| 2017/0078468 A1* | 3/2017 | Cho | G06F 1/1652 |
| 2017/0160924 A1* | 6/2017 | Xie | G06F 3/0237 |
| 2017/0185287 A1 | 6/2017 | Unruh et al. | |
| 2018/0136837 A1* | 5/2018 | Curchod | G06F 3/0236 |

* cited by examiner

FOLDABLE DISPLAY DEVICE PROVIDING VIRTUAL KEYBOARD AND METHOD OF DRIVING THE SAME

This application claims priority to Korean Patent Application No. 10-2021-0083777, filed on Jun. 28, 2021, and all the benefits accruing therefrom under 35 U.S.C. § 119, the content of which in its entirety is herein incorporated by reference.

BACKGROUND

1. Field

The present disclosure relates to a foldable display device and a method of driving the foldable display device. More particularly, the present disclosure relates to a foldable display device including a virtual keyboard and a method of driving the foldable display device including the virtual keyboard.

2. Description of the Related Art

In general, a display device includes a display panel and a display panel driver. The display panel includes a plurality of gate lines, a plurality of data lines, and a plurality of pixels. The display panel driver includes a gate driver configured to provide gate signals to the gate lines, a data driver configured to provide data voltages to the data lines, and a driving controller configured to control the gate driver and the data driver.

A foldable display device that can be folded by maximizing a bending characteristic of a foldable display panel has been developed. The foldable display device has at least two display areas, and the display areas may be formed within a single foldable display panel. Meanwhile, a virtual keyboard may be displayed in at least one of the display areas of the foldable display device. When the virtual keyboard is used in the foldable display device, a typing task such as word processing may be performed without a separate keyboard.

SUMMARY

An aspect of the present disclosure is to provide a foldable display device capable of notifying and correcting a typographical error when a plurality of input key values are simultaneously input in a keyboard mode.

Another aspect of the present disclosure is to provide a foldable display device capable of changing a keyboard layout of a virtual keyboard in the keyboard mode.

Still another aspect of the present disclosure is to provide a method of driving the foldable display device.

According to embodiments, a foldable display device includes: a foldable display panel including a folding line, a first display area disposed on a first side of the folding line, and a second display area disposed on a second side of the folding line, where the second display area displays a virtual keyboard including virtual keys when operating in a keyboard mode; a touch panel including a plurality of touch electrodes and which receives a touch input by using the touch electrodes; a data driver which outputs a data voltage to the foldable display panel; a driving controller which controls the data driver; and a touch data generator which generates touch data for input key values based on the touch input, determines at least two input key values of the input key values as a typographical error when the at least two input key values are simultaneously input; and outputs the touch data including the at least two input key values determined as the typographical error to the driving controller. Here, the driving controller activates a typographical error notification function for notifying occurrence of the typographical error and a typographical error correction function for correcting the typographical error based on the touch data.

In embodiments, when at least two of the virtual keys on the virtual keyboard are consecutively touched within a pre-stored reference input time, the touch data generator may determine that at least two input key values corresponding to the at least two of the virtual keys, respectively, are simultaneously input.

In embodiments, when the typographical error notification function is activated, the first display area of the foldable display panel may display a character-type message for notifying the occurrence of the typographical error.

In embodiments, when the typographical error notification function is activated, the second display area of the foldable display panel may change a color of the virtual keyboard displayed therein.

In embodiments, when the typographical error notification function is activated, a warning sound or a vibration for notifying the occurrence of the typographical error may be output.

In embodiments, the driving controller may be wirelessly connected to a wearable device. In addition, the wearable device may output the warning sound or the vibration for notifying the occurrence of the typographical error.

In embodiments, when the typographical error correction function is activated, the touch data generator may determine an input key value corresponding to a virtual key having a greatest touch intensity among the at least two input key values that are simultaneously input as a correct input and may generate the touch data based on the correct input.

In embodiments, the touch intensity may be calculated based on a pressure of the touch input, a position of the touch input, and a time of the touch input to a corresponding virtual key.

According to embodiments, a foldable display device includes: a foldable display panel including a folding line, a first display area disposed on a first side of the folding line, and a second display area disposed on a second side of the folding line, where the second display area displays a virtual keyboard including virtual keys when operating in a keyboard mode; a touch panel including a plurality of touch electrodes and which receives a touch input by using the touch electrodes; a data driver which outputs a data voltage to the foldable display panel; a driving controller which controls the data driver; and a touch data generator which generates touch data for input key values based on the touch input and outputs the touch data to the driving controller. Here, a keyboard layout of the virtual keyboard displayed in the second display area is changeable.

In embodiments, the keyboard layout may include a first keyboard length, a second keyboard length, a third keyboard length, and a fourth keyboard length, which determine a size of the virtual keyboard. The first keyboard length may be a length of the virtual keyboard in a vertical direction. The second keyboard length may be a length of the virtual keyboard in a horizontal direction. The third keyboard length may be a length of a width of each of the virtual keys included in the virtual keyboard. The fourth keyboard length may be a length of a gap between two adjacent virtual keys of the virtual keys included in the virtual keyboard.

In embodiments, the first keyboard length may include a first-first keyboard length and a first-second keyboard length. The first-first keyboard length may be a length between the folding line and an uppermost end of the virtual keyboard. The first-second keyboard length may be a length between the uppermost end of the virtual keyboard and a lowermost end of the virtual keyboard.

In embodiments, the second keyboard length may include a second-first keyboard length and a second-second keyboard length. The second-first keyboard length may be a length between a left edge of the foldable display panel and a left edge of the virtual keyboard. The second-second keyboard length may be a length between the left edge of the virtual keyboard and a right edge of the virtual keyboard.

In embodiments, each of the first keyboard length, the second keyboard length, the third keyboard length, and the fourth keyboard length may be changed based on a user setting.

In embodiments, the touch data generator may determine at least two input key values of the input key values as a typographical error when the at least two input key values are simultaneously input and may output the touch data including the at least two input key values determined as the typographical error to the driving controller. In addition, the driving controller may generate accumulated typographical error data by accumulating the at least two input key values determined as the typographical error included in the touch data. Further, the driving controller may change at least one of the first keyboard length, the second keyboard length, the third keyboard length, and the fourth keyboard length based on the accumulated typographical error data.

In embodiments, the driving controller may activate a typographical error notification function for notifying occurrence of the typographical error based on the touch data. In addition, when the typographical error notification function is activated, the first display area of the foldable display panel may display a character-type message for notifying the occurrence of the typographical error.

In embodiments, the driving controller may activate a typographical error notification function for notifying occurrence of the typographical error based on the touch data. In addition, when the typographical error notification function is activated, the second display area of the foldable display panel may change a color of the virtual keyboard displayed therein.

In embodiments, the driving controller may activate a typographical error notification function for notifying occurrence of the typographical error based on the touch data. In addition, when the typographical error notification function is activated, a warning sound or a vibration for notifying the occurrence of the typographical error may be output.

In embodiments, the driving controller may activate a typographical error correction function for correcting the typographical error based on the touch data. In addition, when the typographical error correction function is activated, the touch data generator may determine an input key value corresponding to a virtual key having a greatest touch intensity among the at least two input key values that are simultaneously input as a correct input and may generate the touch data based on the correct input.

According to embodiments, a method of driving a foldable display device includes: displaying an image in a first display area disposed on a first side of a folding line of a foldable display panel; displaying a virtual keyboard including virtual keys in a second display area disposed on a second side of the folding line of the foldable display panel; receiving a touch input for the virtual keyboard by using touch electrodes; and generating touch data for input key values based on the touch input. Here, a keyboard layout of the virtual keyboard displayed in the second display area is changeable, the keyboard layout includes a first keyboard length, a second keyboard length, a third keyboard length, and a fourth keyboard length, which determine a size of the virtual keyboard, the first keyboard length is a length of the virtual keyboard in a vertical direction, the second keyboard length is a length of the virtual keyboard in a horizontal direction, the third keyboard length is a length of a width of each of the virtual keys included in the virtual keyboard, and the fourth keyboard length is a length of a gap between two adjacent virtual keys of the virtual keys included in the virtual keyboard.

In embodiments, the method may further include: determining at least two input key values of the input key values as a typographical error when the at least two input key values are simultaneously input; and activating a typographical error notification function for notifying occurrence of the typographical error and a typographical error correction function for correcting the typographical error. Here, when the typographical error notification function is activated, the first display area may display a character-type message for notifying the occurrence of the typographical error. In addition, when the typographical error correction function is activated, an input key value corresponding to a virtual key having a greatest touch intensity among the at least two input key values that are simultaneously input may be determined as a correct input, and the touch data may be generated based on the correct input.

According to the foldable display device and the method of driving the foldable display device, when at least two input key values are simultaneously input in the keyboard mode, the foldable display device may notify the occurrence of the typographical error and may correct the typographical error. Therefore, when the virtual keyboard is used, the occurrence of the typographical error can be effectively reduced.

In addition, according to the foldable display device and the method of driving the foldable display device, the foldable display device may change the layout of the virtual keyboard in the keyboard mode. Therefore, a convenience of using the virtual keyboard can be effectively increased.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, embodiments of the present disclosure will be explained in detail with reference to the accompanying drawings.

Figure 1:
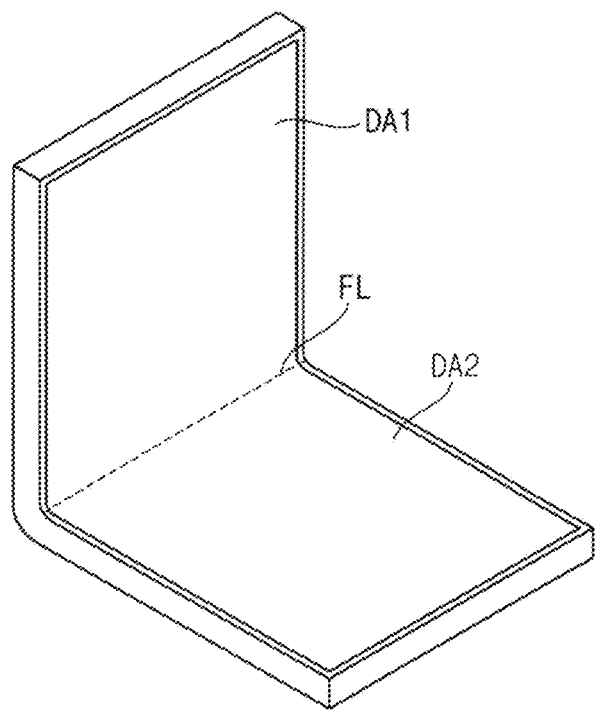
FIG. 1 is a perspective view illustrating a foldable display device according to embodiments.
Figure 2:
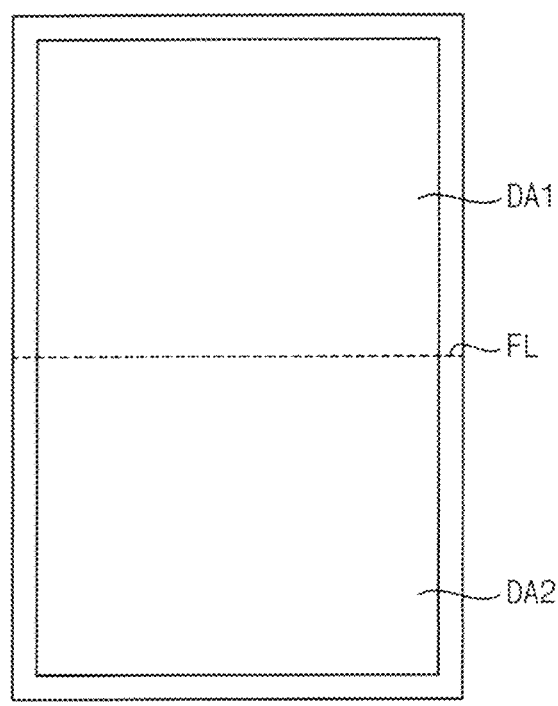
FIG. 2 is a plan view illustrating the foldable display device of FIG. 1.

FIG. 1 is a perspective view illustrating a foldable display device according to embodiments, and FIG. 2 is a plan view illustrating the foldable display device of FIG. 1.

Referring to FIGS. 1 and 2, a display device according to the present disclosure may be a foldable display device. The foldable display device may be folded along a folding line FL. The foldable display device may include a foldable display panel.

The foldable display panel may include a first display area DA1 disposed on a first side of the folding line FL, and a second display area DA2 disposed on a second side of the folding line FL.

In a first mode, the first display area DA1 and the second display area DA2 of the display panel may display a single continuous image together. Here, a part of the image displayed in the first display area DA1 may be different from a part of the image displayed in the second display area DA2. The first mode may be a normal mode. The first mode may be an unfolding mode in which the display panel is unfolded.

In a second mode, the first display area DA1 and the second display area DA2 of the display panel may display mutually different images with respect to the folding line FL. For example, when viewed in a plan view as FIG. 2, a first image displayed in the first display area DA1 may be a main image for allowing a user to perform word processing or the like. A second image displayed in the second display area DA2 may be a sub-image for supporting the first image. The second mode may be a folding mode in which the display panel is folded (e.g., the angle between the first display area DA1 and the second display area DA2 is about 90 degrees). The second mode may be a keyboard mode. When operating in the keyboard mode, the second image displayed in the second display area may be a virtual keyboard including virtual keys.

The first mode and the second mode may be determined according to a folded state of the foldable display panel. In addition, the first mode and the second mode may be determined according to a user setting, regardless of the folded state of the foldable display panel.

Figure 3:
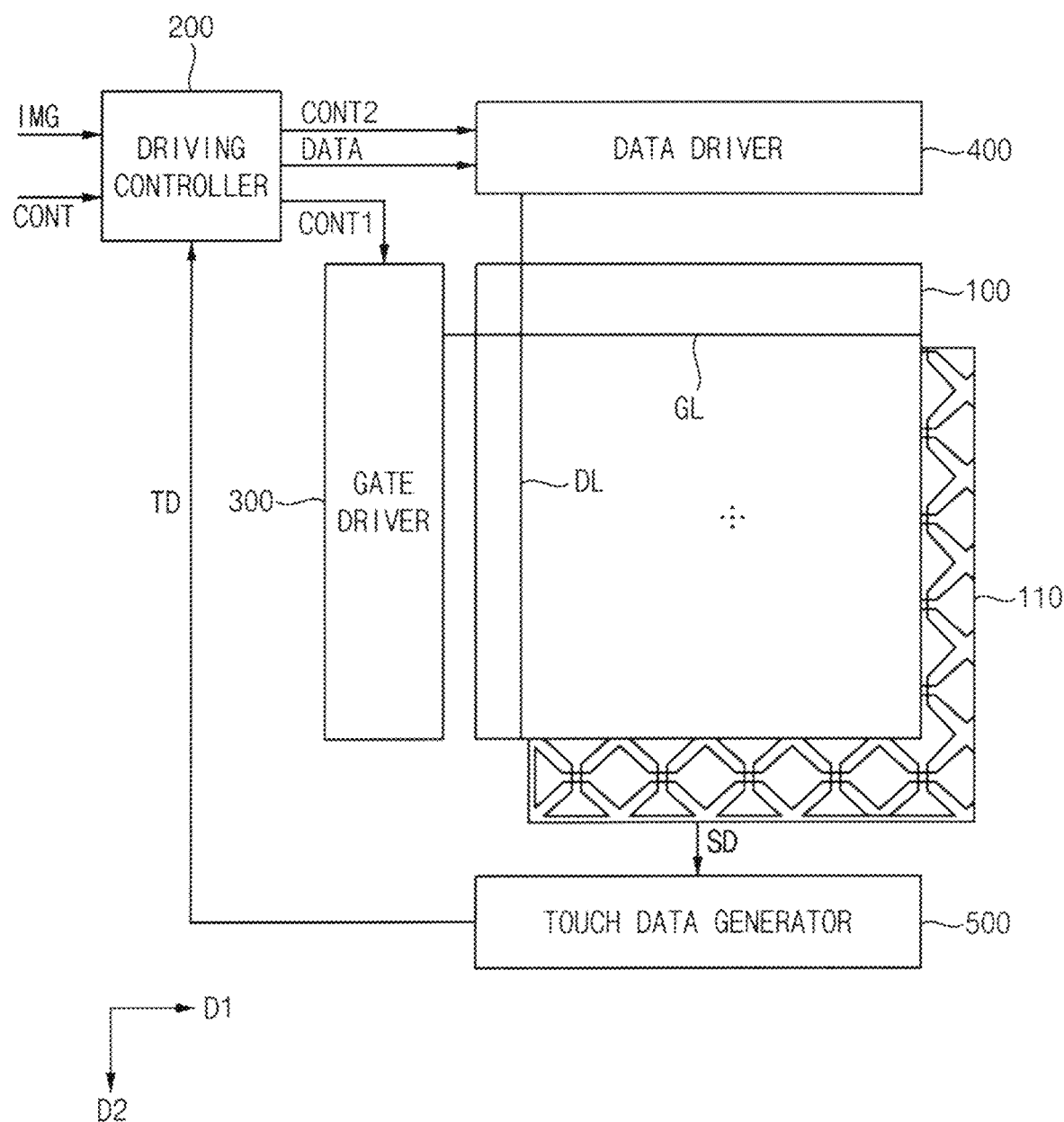
FIG. 3 is a block diagram illustrating the foldable display device of FIG. 1.
Figure 4:
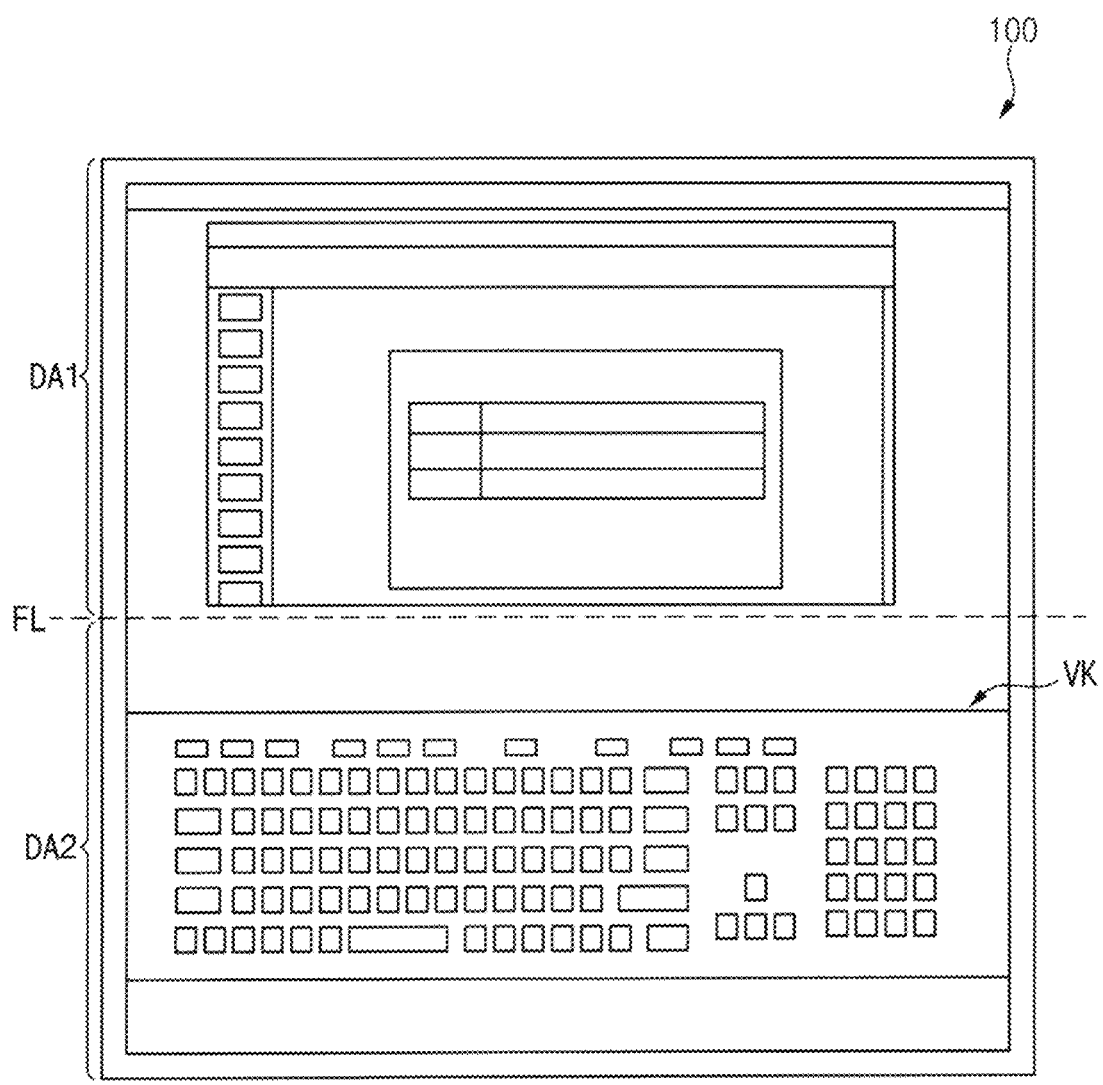
FIG. 4 is a diagram illustrating an example of a foldable display panel when operating in a keyboard mode.

FIG. 3 is a block diagram illustrating the foldable display device of FIG. 1, and FIG. 4 is a diagram illustrating an example of a foldable display panel when operating in a keyboard mode.

Referring to FIGS. 1 to 3, the foldable display device may include a foldable display panel 100, a touch panel 110, and a foldable display panel driver. The foldable display panel driver may include a driving controller 200, a gate driver 300, a data driver 400, and a touch data generator 500.

The foldable display panel 100 may include a display part in which an image is displayed, and a peripheral part that is adjacent to the display part.

The foldable display panel 100 may include a plurality of gate lines GL, a plurality of data lines DL, and a plurality of pixels electrically connected to the gate lines GL and the data lines DL, respectively. The gate lines GL may extend in a first direction D1, and the data lines DL may extend in a second direction D2 intersecting the first direction D1.

In an embodiment, the foldable display panel 100 may include a first display area DA1 that is adjacent to a first end of the foldable display panel 100, and a second display area DA2 that is adjacent to a second end of the foldable display panel 100. The first display area DA1 and the second display area DA2 may be connected to each other. The first display area DA1 and the second display area DA2 may be partitioned based on the folding line FL at which the foldable display panel 100 is folded.

The touch panel 110 may be a capacitive type touch panel configured to sense a variation of a capacitance due to a touch of a conductive object (e.g., a finger, a stylus pen, etc.). The touch panel 110 may include a plurality of touch electrodes. For example, the touch panel 110 may include a plurality of first electrodes extending in the first direction D1, and a plurality of second electrodes extending in the second direction D2 that is orthogonal to the first direction D1. In an embodiment, the first electrodes and the second electrodes may be disposed in substantially the same layer. Here, each of the first electrodes and the second electrodes may have a structure in which a plurality of consecutive polygons having a diamond shape are connected to each other. However, the structure of the first electrodes and the structure of the second electrodes of the touch panel 110 according to the present disclosure are not limited to the structure in which the continuous polygons having the diamond shape are connected to each other. In another embodiment, for example, a layer in which the first electrodes are disposed may be different from a layer in which the second electrodes are disposed. Here, each of the first electrodes and the second electrodes may have a straight-line shape. In addition, in some embodiments, the touch panel 110 may be an add-on type touch panel attached to the foldable display panel 100, or an embedded type touch panel disposed within the foldable display panel 100. For example, the touch panel 110 may be an on-cell type embedded touch panel, or an in-cell type embedded touch panel.

The touch panel 110 may receive a touch input by using the touch electrodes. The touch data generator 500 may sense the touch input of the touch panel 110, and receive sensing data SD including the touch input.

The driving controller 200 may receive input image data IMG and an input control signal CONT from an external device (not shown). For example, the input image data IMG may include red image data R, green image data G, and blue image data B. The input control signal CONT may include a master clock signal and a data enable signal. The input control signal CONT may further include a vertical synchronization signal and a horizontal synchronization signal. The driving controller 200 may receive the touch data TD from the touch data generator 500. For example, the touch data TD may include a touch input signal, an input key value, and an input key value determined as a typographical error.

The driving controller 200 may generate a first control signal CONT1 and a second control signal CONT2 based on the input image data IMG, the input control signal CONT, and the touch data TD.

The driving controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The driving controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The driving controller 200 may generate a data signal DATA based on the input image data IMG and the touch data TD. The driving controller 200 may output the data signal DATA to the data driver 400.

The gate driver 300 may generate gate signals for driving the gate lines GL in response to the first control signal CONT1 received from the driving controller 200. The gate driver 300 may output the gate signals to the gate lines GL.

The data driver 400 may receive the second control signal CONT2 and the data signal DATA from the driving controller 200. The data driver 400 may convert the data signal DATA into an analog data voltage. The data driver 400 may output the data voltage to the data line DL.

The touch data generator 500 may receive the sensing data SD from the touch panel 110. The touch data generator 500 may generate the touch data TD corresponding to the touch input based on the sensing data SD. For example, when operating in the keyboard mode, the touch data generator 500 may generate the touch data TD for input key values based on the touch input. The touch data generator 500 may output the touch data TD to the driving controller 200.

Referring to FIG. 4, the foldable display device may display the first image, which is the main image, in the first display area DA1 and the second image, which is the sub-image, in the second display area DA2 in the folding mode. For example, when operating in the keyboard mode, the first image may be displayed in the first display area DA1, and a virtual keyboard VK including virtual keys may be displayed in the second display area DA2. When operating in the keyboard mode, the user may make the first image of the first display area DA1 display a character typed by using the virtual keyboard VK of the second display area DA2. When the virtual keyboard VK is used, since a display screen is flat, the virtual keys may not be tactually distinguished from each other, so that occurrence of a typographical error may be increased. In addition, when the virtual keyboard VK is used in the folding mode, a distance between the first image of the first display area DA1 and the virtual keyboard VK may be short, so that a convenience of using the virtual keyboard VK may be reduced.

According to the present disclosure, the foldable display device may detect the occurrence of the typographical error when operating in the keyboard mode, and may activate a typographical error notification function for notifying the occurrence of the typographical error or a typographical error correction function for correcting the typographical error. In addition, according to the present disclosure, the foldable display device may change a keyboard layout of the virtual keyboard VK when operating in the keyboard mode. Therefore, according to the present disclosure, the foldable display device may reduce the occurrence of the typographical error when operating in the keyboard mode, and increase the convenience of using the virtual keyboard VK.

Figure 5:
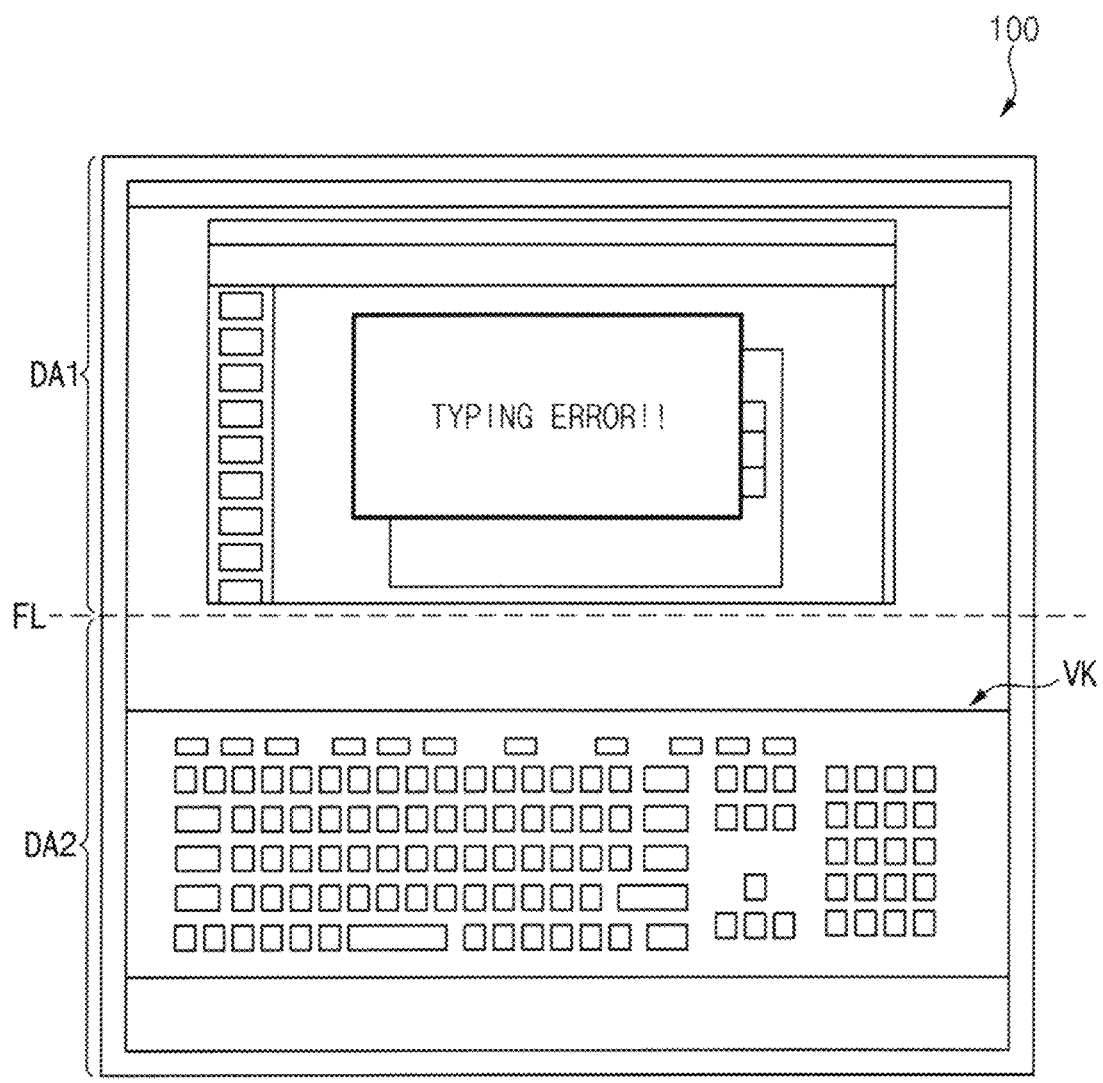
FIG. 5 is a diagram illustrating an example in which a character-type message is output on the foldable display panel of FIG. 4 when a typographical error notification function is activated.
Figure 6:
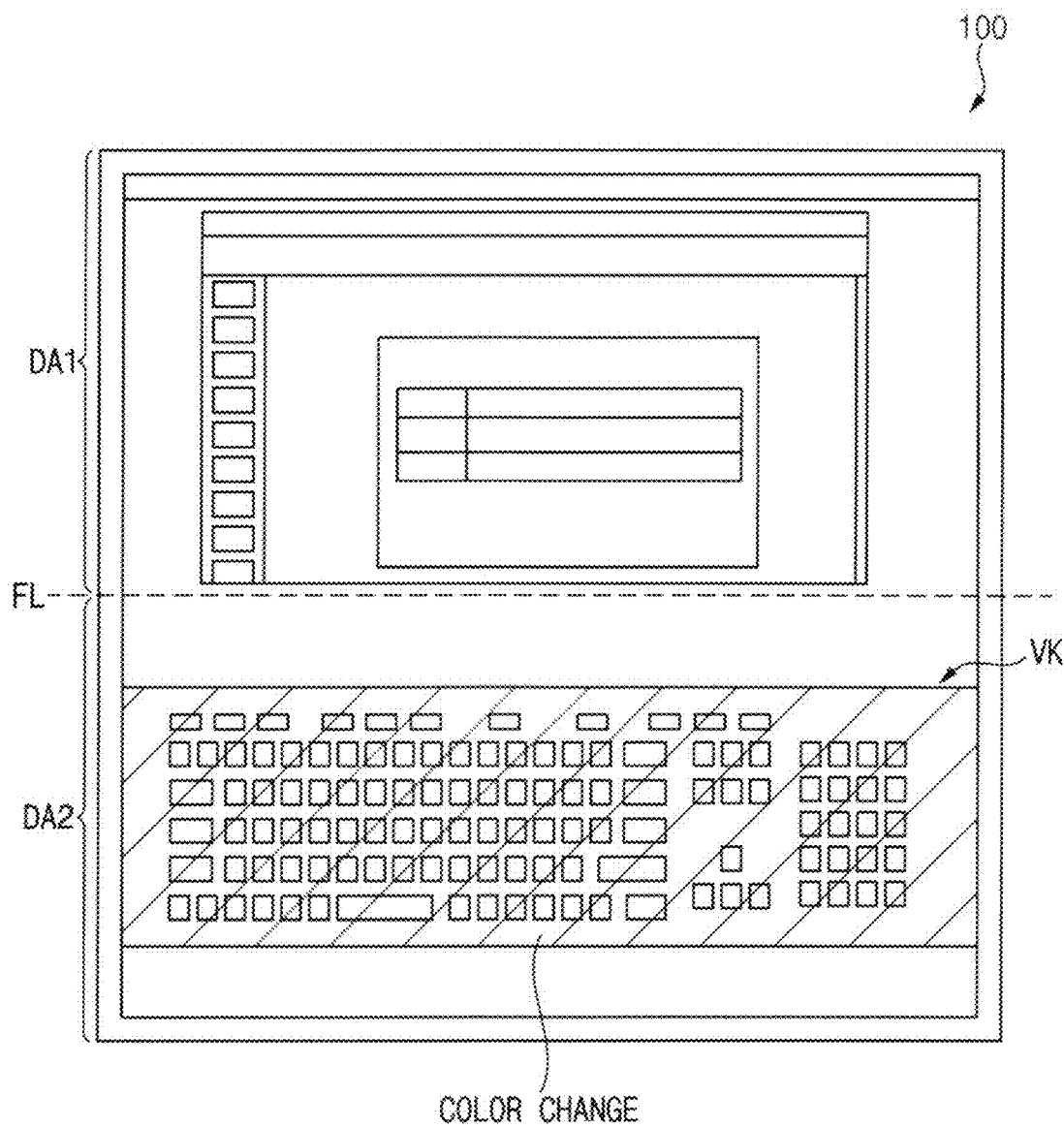
FIG. 6 is a diagram illustrating an example in which a color of a virtual keyboard of the foldable display panel of FIG. 4 is changed when a typographical error notification function is activated.
Figure 7:
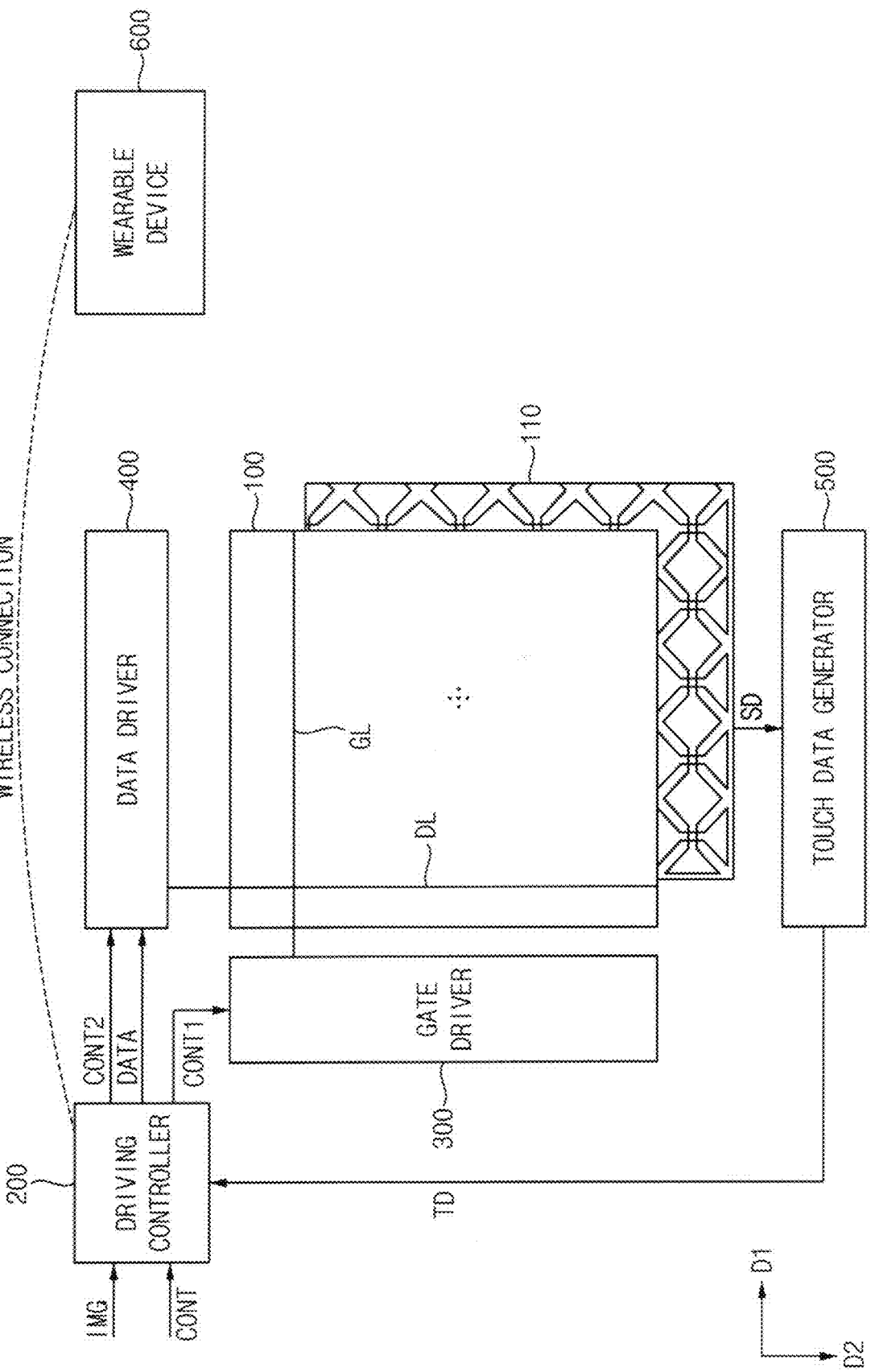
FIG. 7 is a diagram illustrating an example in which the foldable display device of FIG. 1 is wirelessly connected to a wearable device.

FIG. 5 is a diagram illustrating an example in which a character-type message is output on the foldable display panel of FIG. 4 when a typographical error notification function is activated, FIG. 6 is a diagram illustrating an example in which a color of a virtual keyboard of the foldable display panel of FIG. 4 is changed when a typographical error notification function is activated, and FIG. 7 is a diagram illustrating an example in which the foldable display device of FIG. 1 is wirelessly connected to a wearable device.

Referring to FIGS. 5 to 7, the foldable display device may detect the occurrence of the typographical error when operating in the keyboard mode, and may activate the typographical error notification function for notifying the occurrence of the typographical error or the typographical error correction function for correcting the typographical error. For example, when at least two of the virtual keys are simultaneously touched, the foldable display device may determine the at least two of the virtual keys as a typographical error, and may activate the typographical error notification function for notifying the occurrence of the typographical error and the typographical error correction function for correcting the typographical error.

The touch data generator 500 may generate the touch data TD for the input key values based on the touch input. For example, the touch data generator 500 may sense the touch input of the touch panel 110, and receive the sensing data SD including the touch input. The touch data generator 500 may generate the touch data TD for the input key values corresponding to the touch input based on the sensing data SD. The touch data generator 500 may output the touch data TD to the driving controller 200.

When at least two input key values are simultaneously input, the touch data generator 500 may determine the at least two input key values as a typographical error. For example, when the at least two of the virtual keys on the virtual keyboard VK are consecutively touched within a pre-stored reference input time, the touch data generator 500 may determine that the at least two input key values corresponding to the at least two of the virtual keys, respectively, are simultaneously input. For example, the pre-stored reference input time may be 0.6 seconds. When the at least two of the virtual keys are consecutively touched within 0.6 seconds, a typing speed may be greater than or equal to 1000 words per minute. In other words, when the typing speed is greater than or equal to 1000 words per minute, the touch data generator 500 may determine the at least two of the virtual keys as the typographical error. The touch data generator 500 may output the touch data TD including the at least two input key values determined as the typographical error to the driving controller 200. The driving controller 200 may activate the typographical error notification function for notifying the occurrence of the typographical error based on the touch data TD.

In an embodiment, when the typographical error notification function is activated, a character-type message for notifying the occurrence of the typographical error may be output to the first display area DA1 of the foldable display panel 100. For example, as shown in FIG. 5, when the typographical error notification function is activated, a pop-up message (e.g., "TYPING ERROR!!") for notifying that occurrence of the typographical error may be output to the first display area DA1 in which the first image is displayed. Here, the user may recognize the occurrence of the typographical error through the message output to the first display area DA1, so that the occurrence of the typographical error may be effectively reduced.

In an embodiment, when the typographical error notification function is activated, a color of the virtual keyboard VK displayed in the second display area DA2 of the foldable display panel 100 may be changed. For example, as shown in FIG. 6, when the typographical error notification function is activated, a background color of the virtual keyboard VK displayed in the second display area DA2 may be changed. For example, when the typographical error notification function is activated, a color of each of the virtual keys of the virtual keyboard VK displayed in the second display area DA2 may be changed. The color of the virtual keyboard VK may be changed to red, orange, or yellow to effectively notify the occurrence of the typographical error, but the color of the virtual keyboard VK is not limited thereto. Here, the user may recognize the occurrence of the typographical error through the change of the color of the virtual keyboard VK, so that the occurrence of the typographical error may be effectively reduced.

In an embodiment, when the typographical error notification function is activated, a warning sound or a vibration for notifying the occurrence of the typographical error may be output. For example, the foldable display device may include a separate speaker, and when the typographical error notification function is activated, the warning sound for notifying the occurrence of the typographical error may be output through the speaker. For example, the foldable display device may include a separate vibration element, and when the typographical error notification function is activated, the vibration for notifying the occurrence of the typographical error may be output through the vibration element. In addition, the foldable display device may output the warning sound or the vibration for notifying the occurrence of the typographical error to an external wearable device. For example, as shown in FIG. 7, the driving controller 200 may be wirelessly connected to the wearable device. The driving controller 200 may control the wearable device based on the touch data TD. When the typographical error notification function is activated, the wearable device may output the warning sound or the vibration for notifying the occurrence of the typographical error. The wearable device may be a smart watch and smart glasses, but the wearable device is not limited thereto. Here, the user may recognize the occurrence of the typographical error through the warning sound or the vibration, so that the occurrence of the typographical error may be effectively reduced.

In an embodiment, when the typographical error correction function is activated, the touch data generator 500 may determine the input key value corresponding to the virtual key having the greatest touch intensity among at least two input key values that are simultaneously input as an input key value intended by the user. The touch intensity may be calculated based on a pressure of the touch input, a position of the touch input, and a time of the touch input to the corresponding virtual key. For example, when the at least two of the virtual keys on the virtual keyboard VK are simultaneously touched, the virtual keys may have mutually different touch intensities according to the pressure of the touch input, the position of the touch input, and the time of the touch input. The touch data generator 500 may calculate the touch intensity of each of the virtual keys based on the sensed data SD, and determine the input key value corresponding to the virtual key having the greatest touch intensity as a correct input. The touch data generator 500 may generate the touch data TD based on the correct input. The driving controller 200 may generate the data signal DATA corresponding to the input key value intended by the user based on the touch data TD. Here, at least two input key values that are simultaneously input are corrected into a specific input key value intended by the user, so that the occurrence of the typographical error may be effectively reduced.

Figure 8:
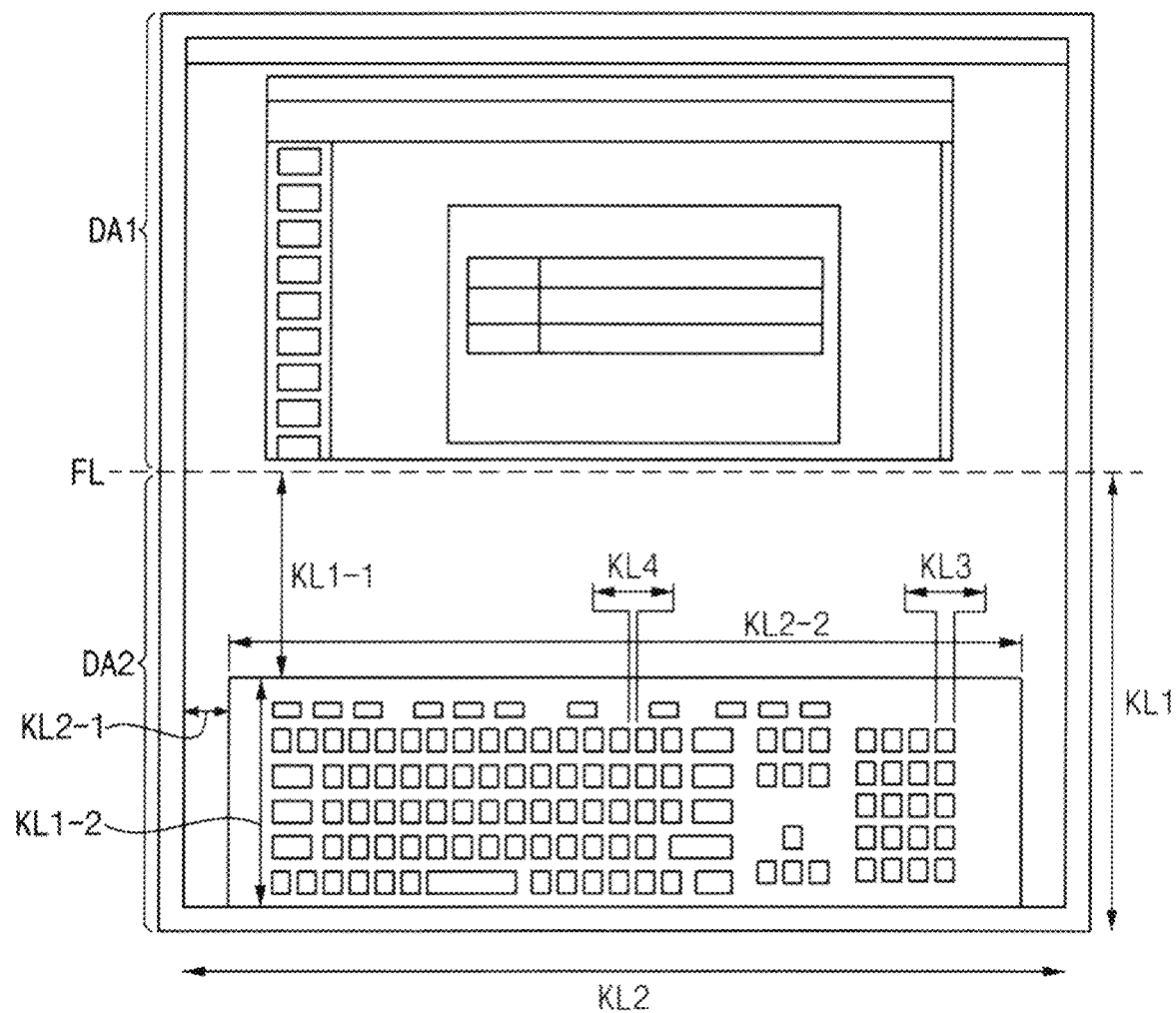
FIG. 8 is a diagram illustrating an example in which a keyboard layout of a virtual keyboard is changed in the foldable display panel of FIG. 4.

FIG. 8 is a diagram illustrating an example in which a keyboard layout of a virtual keyboard is changed in the foldable display panel of FIG. 4.

Referring to FIG. 8, the foldable display device may change the keyboard layout of the virtual keyboard VK when operating in the keyboard mode. For example, as the keyboard layout is changed, a position and a size of the virtual keyboard VK displayed in the second display area DA2 may be adjusted. The keyboard layout may include a first keyboard length KL1, a second keyboard length KL2, a third keyboard length KL3, and a fourth keyboard length KL4, which determine the size of the virtual keyboard VK.

For example, the first keyboard length KL1 may be a length of the virtual keyboard VK in a vertical direction. The first keyboard length KL1 may include a first-first keyboard length KL1-1 and a first-second keyboard length KL1-2. The first-first keyboard length KL1-1 may be a length between the folding line FL and an uppermost end of the virtual keyboard VK. The first-second keyboard length KL1-2 may be a length between the uppermost end of the virtual keyboard VK and a lowermost end of the virtual keyboard VK. In other words, the first-second keyboard length KL1-2 may be a width of the virtual keyboard VK in the vertical direction.

For example, the second keyboard length KL2 may be a length of the virtual keyboard VK in a horizontal direction. The second keyboard length KL2 may include a second-first keyboard length KL2-1 and a second-second keyboard length KL2-2. The second-first keyboard length KL2-1 may be a length between a left edge of the foldable display panel 100 and a left edge of the virtual keyboard VK. The second-second keyboard length KL2-2 may be a length between the left edge of the virtual keyboard VK and a right edge of the virtual keyboard VK. In other words, the second-second keyboard length KL2-2 may be a width of the virtual keyboard VK in the horizontal direction.

For example, the third keyboard length KL3 may be a length of a width of each of the virtual keys included in the virtual keyboard VK. The third keyboard length KL3 may be a width of each the virtual keys in the vertical direction. The third keyboard length KL3 may also be a width of each of the virtual keys in the horizontal direction.

For example, the fourth keyboard length KL4 may be a length of a gap between two adjacent virtual keys included in the virtual keyboard VK. The fourth keyboard length KL4 may be a gap between the virtual keys that are adjacent to each other in the vertical direction. The fourth keyboard length KL4 may also be a gap between the virtual keys that are adjacent to each other in the horizontal direction.

In an embodiment, the keyboard layout of the virtual keyboard VK may be set by the user. In detail, each of the first keyboard length KL1, the second keyboard length KL2, the third keyboard length KL3, and the fourth keyboard length KL4 may be changed based on a user setting. For example, the keyboard layout may be changed by allowing the user to directly set each of the first keyboard length KL1, the second keyboard length KL2, the third keyboard length KL3, and the fourth keyboard length KL4. As another example, the keyboard layout may be changed by allowing the user to select one keyboard layout among pre-stored sampling keyboard layouts.

In an embodiment, the keyboard layout of the virtual keyboard VK may be changed based on the touch data TD. In detail, the foldable display device may detect the occurrence of the typographical error when operating in the keyboard mode, generate accumulated typographical error data by accumulating the typographical error, and change the keyboard layout based on the accumulated typographical error data. For example, the touch data generator 500 may determine at least two input key values as the typographical error when the at least two input key values are simultaneously input, and output the touch data TD including the at least two input key values determined as the typographical error to the driving controller 200. The driving controller 200 may generate the accumulated typographical error data by accumulating the at least two input key values determined as the typographical error included in the touch data TD. The driving controller 200 may change at least one of the first keyboard length KL1, the second keyboard length KL2, the third keyboard length KL3, and the fourth keyboard length KL4 based on the accumulated typographical error data. As described above, when the keyboard layout is changed based on the accumulated typographical error data, the foldable display device may provide the keyboard layout optimized to the user by reflecting typing characteristics of the user.

Figure 9:
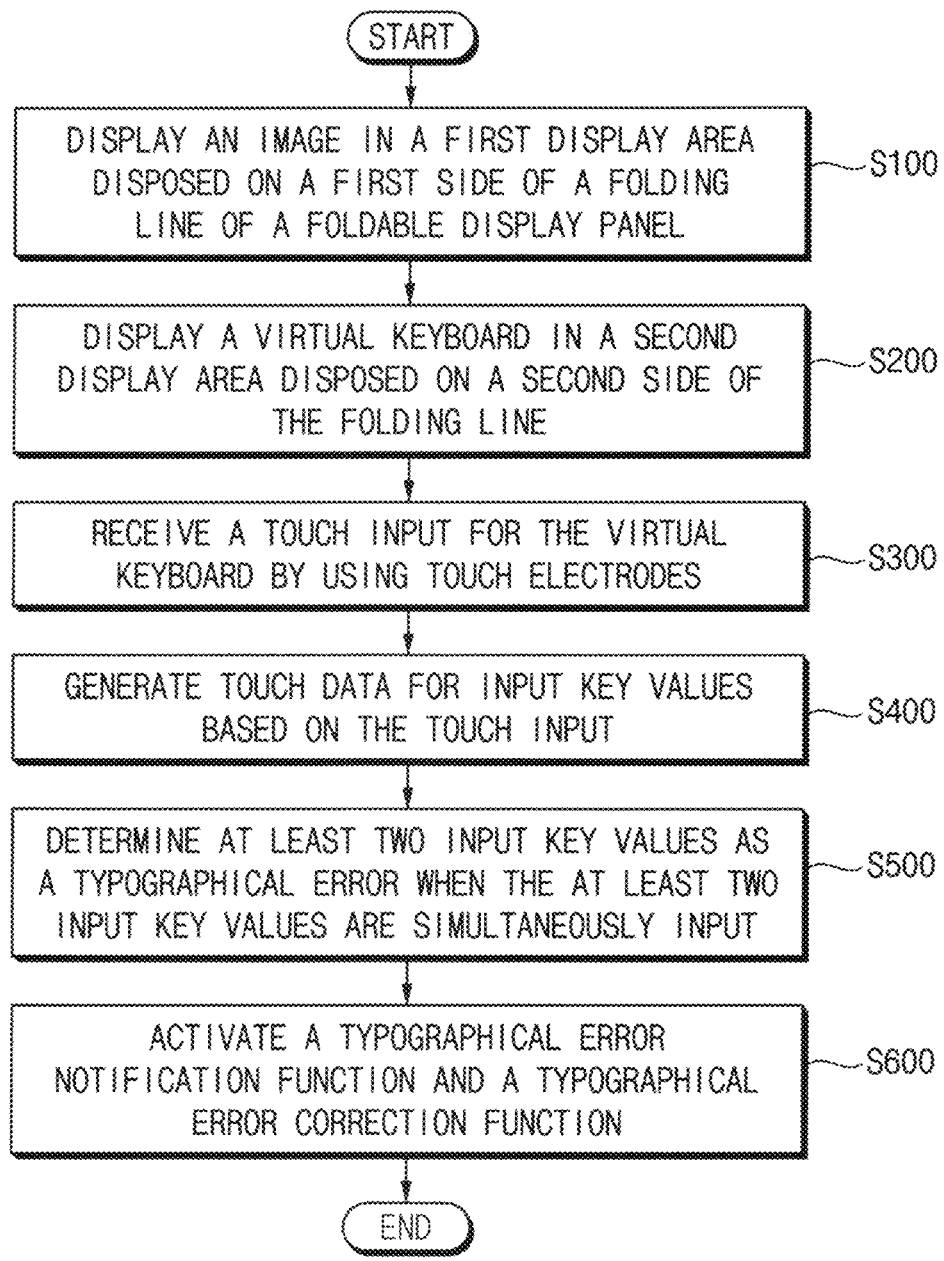
FIG. 9 is a flowchart illustrating an operation of the foldable display device of FIG. 1.

FIG. 9 is a flowchart illustrating an operation of the foldable display device of FIG. 1.

Referring to FIGS. 3 to 9, a foldable display device may display an image in a first display area DA1 disposed on a first side of a folding line FL of a foldable display panel 100 (S100), may display a virtual keyboard VK in a second display area DA2 disposed on a second side of the folding line FL of the foldable display panel 100 (S200), may receive a touch input for the virtual keyboard VK by using touch electrodes (S300), may generate touch data TD for input key values based on the touch input (S400), may determine at least two input key values as a typographical error when the at least two input key values are simultaneously input (S500), and may activate a typographical error notification function for notifying occurrence of the typographical error and a typographical error correction function for correcting the typographical error (S600).

In an embodiment, the foldable display device may display the image in the first display area DA1 disposed on the first side of the folding line FL of the foldable display panel 100 (S100) and may display the virtual keyboard VK in the second display area DA2 disposed on the second side of the folding line FL of the foldable display panel 100 (S200). In detail, the foldable display device may display a first image, which is a main image, in the first display area DA1 and a second image, which is a sub-image, in the second display area DA2 in a folding mode. For example, when operating in a keyboard mode, the first image may be displayed in the first display area DA1, and the virtual keyboard VK including virtual keys (i.e., second image) may be displayed in the second display area DA2. When operating in the keyboard mode, a user may type a character in the first image of the first display area DA1 by using the virtual keyboard VK of the second display area DA2

In an embodiment, the foldable display device may receive the touch input for the virtual keyboard VK by using the touch electrodes (S300) and may generate the touch data TD for the input key values based on the touch input (S400). In detail, the touch panel 110 may be a capacitive type touch panel configured to sense a variation of a capacitance due to a touch of a conductive object (e.g., a finger, a stylus pen, etc.). The touch panel 110 may include a plurality of touch electrodes. The touch panel 110 may receive the touch input by using the touch electrodes. The touch data generator 500 may sense the touch input of the touch panel 110, and receive sensing data SD including the touch input. The touch data generator 500 may generate the touch data TD corresponding to the touch input based on the sensing data SD. For example, when operating in the keyboard mode, the touch data generator 500 may generate the touch data TD for the input key values based on the touch input. The touch data generator 500 may output the touch data TD to the driving controller 200. The touch data TD may include a touch input signal, an input key value, and an input key value determined as a typographical error. The driving controller 200 may generate a data signal DATA based on input image data IMG and the touch data TD.

The foldable display device may change a keyboard layout of the virtual keyboard VK when operating in the keyboard mode. For example, as the keyboard layout is changed, a position and a size of the virtual keyboard VK displayed in the second display area DA2 may be adjusted. The keyboard layout may include a first keyboard length KL1, a second keyboard length KL2, a third keyboard length KL3, and a fourth keyboard length KL4, which determine the size of the virtual keyboard VK.

For example, the first keyboard length KL1 may be a length of the virtual keyboard VK in a vertical direction. The first keyboard length KL1 may include a first-first keyboard length KL1-1 and a first-second keyboard length KL1-2. The first-first keyboard length KL1-1 may be a length between the folding line and an uppermost end of the virtual keyboard VK. The first-second keyboard length KL1-2 may be a length between the uppermost end of the virtual keyboard VK and a lowermost end of the virtual keyboard VK. For example, the second keyboard length KL2 may be a length of the virtual keyboard VK in a horizontal direction. The second keyboard length KL2 may include a second-first keyboard length KL2-1 and a second-second keyboard length KL2-2. The second-first keyboard length KL2-1 may be a length between a left edge of the foldable display panel and a left edge of the virtual keyboard VK. The second-second keyboard length KL2-2 may be a length between the left edge of the virtual keyboard VK and a right edge of the virtual keyboard VK. For example, the third keyboard length KL3 may be a length of a width of each of the virtual keys included in the virtual keyboard VK. The third keyboard length KL3 may be a width of each the virtual keys in the vertical direction. The third keyboard length KL3 may be a width of each of the virtual keys in the horizontal direction. For example, the fourth keyboard length KL4 may be a length of a gap between two adjacent virtual keys included in the virtual keyboard VK. The fourth keyboard length KL4 may be a gap between the virtual keys that are adjacent to each other in the vertical direction. The fourth keyboard length KL4 may also be a gap between the virtual keys that are adjacent to each other in the horizontal direction. As described above, according to the foldable display device, the layout of the virtual keyboard VK may be changed in the keyboard mode, so that a convenience of using the virtual keyboard VK may be effectively increased.

In an embodiment, the foldable display device may determine at least two input key values as the typographical error when the at least two input key values are simultaneously input (S500). In detail, when the at least two of the virtual keys on the virtual keyboard VK are consecutively touched within a pre-stored reference input time, the touch data generator 500 may determine that the at least two input key values corresponding to the at least two of the virtual keys, respectively, are simultaneously input. For example, the reference input time may be 0.6 seconds. When the at least two of the virtual keys are consecutively touched within 0.6 seconds, a typing speed may be greater than or equal to 1000 words per minute. In other words, when the typing speed is greater than or equal to 1000 words per minute, the touch data generator 500 may determine the at least two of the virtual keys as the typographical error. The touch data generator 500 may output the touch data TD including the at least two input key values determined as the typographical error to the driving controller.

In an embodiment, the foldable display device may activate the typographical error notification function for notifying the occurrence of the typographical error and the typographical error correction function for correcting the typographical error (S600). In detail, the driving controller 200 may receive the touch data TD from the touch data generator 500, and activate the typographical error notification function for notifying the occurrence of the typographical error and the typographical error correction function based on the touch data TD. For example, when the typographical error notification function is activated, a character-type message for notifying the occurrence of the typographical error may be output to the first display area DA1 of the foldable display panel 100. For example, when the typographical error notification function is activated, a color of the virtual keyboard VK displayed in the second display area DA2 of the foldable display panel 100 may be changed. For example, when the typographical error notification function is activated, a warning sound or a vibration for notifying the occurrence of the typographical error may be output. Here, the warning sound or the vibration may be output from a wearable device 600 wirelessly connected to the driving controller 200. For example, when the typographical error correction function is activated, the touch data generator 500 may determine the input key value corresponding to the virtual key having the greatest touch intensity among at least two input key values that are simultaneously input as a correct input (i.e., an input key value intended by the user). The touch intensity may be calculated based on a pressure of the touch input, a position of the touch input, and a time of the touch input to the corresponding virtual key. The touch data generator 500 may generate the touch data TD based on the correct input. Accordingly, when at least two input key values are simultaneously input in the keyboard mode, the foldable display device may notify the occurrence of the typographical error and correct the typographical error. In other words, when the virtual keyboard VK is used, the occurrence of the typographical error may be effectively reduced.

Figure 10:
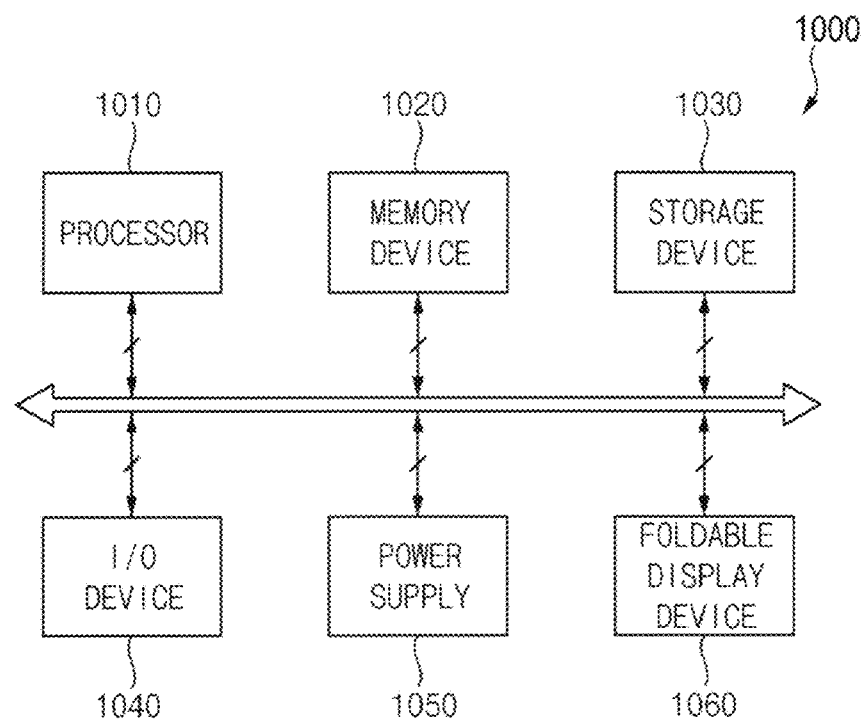
FIG. 10 is a block diagram illustrating an electronic device according to embodiments.
Figure 11:
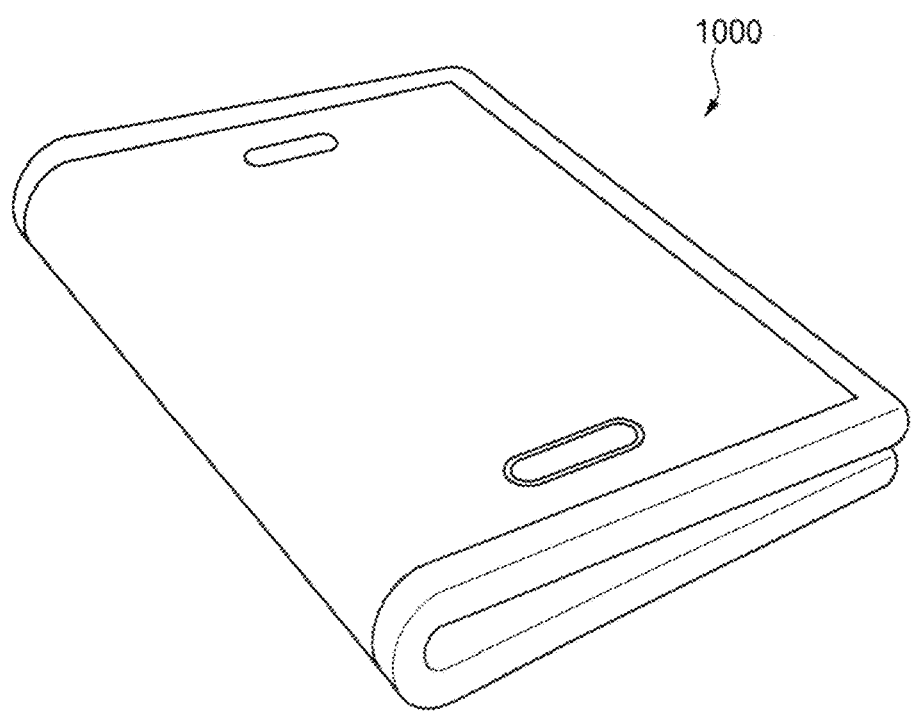
FIG. 11 is a diagram illustrating an example in which the electronic device of FIG. 10 is implemented as a smart phone.

FIG. 10 is a block diagram illustrating an electronic device according to embodiments, and FIG. 11 is a diagram illustrating an example in which the electronic device of FIG. 10 is implemented as a smart phone.

Referring to FIGS. 10 and 11, the electronic device 1000 may include a processor 1010, a memory device 1020, a storage device 1030, an input/output ("I/O") device 1040, a power supply 1050, and a foldable display device 1060. Here, the foldable display device 1060 may be the foldable display device of FIG. 1. In addition, the electronic device 1000 may further include a plurality of ports for communicating with a video card, a sound card, a memory card, a universal serial bus ("USB") device, other electronic devices, etc. In an embodiment, as illustrated in FIG. 11, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display ("HMD") device, etc.

The processor 1010 may perform various computing functions. The processor 1010 may be a micro processor, a central processing unit ("CPU"), an application processor ("AP"), etc. The processor 1010 may be coupled to other components via an address bus, a control bus, a data bus, etc. Further, the processor 1010 may be coupled to an extended bus such as a peripheral component interconnection ("PCI") bus. The memory device 1020 may store data for operations of the electronic device 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile DRAM device, etc. The storage device 1030 may include a solid-state drive ("SSD") device, a hard disk drive ("HDD") device, a CD-ROM device, etc. The I/O device 1040 may include an input device such as a keyboard, a keypad, a mouse device, a touch pad, a touch screen, etc, and an output device such as a printer, a speaker, etc. In some embodiments, the I/O device 1040 may include the foldable display device 1060. The power supply 1050 may provide power for operations of the electronic device 1000. The foldable display device 1060 may be coupled to other components via the buses or other communication links.

The foldable display device 1060 may display an image corresponding to visual information of the electronic device 1000. Here, the foldable display device 1060 may include a foldable display panel including a folding line, a first display area disposed on a first side of the folding line, and a second display area disposed on a second side of the folding line to display a virtual keyboard including virtual keys when operating in a keyboard mode, a touch panel including a plurality of touch electrodes, and configured to receive a touch input by using the touch electrodes, a data driver configured to output a data voltage to the foldable display panel, a driving controller configured to control the data driver, and a touch data generator configured to generate touch data for input key values based on the touch input, determine at least two input key values as a typographical error when the at least two input key values are simultaneously input, and output the touch data including the at least two input key values determined as the typographical error to the driving controller. The driving controller may activate a typographical error notification function for notifying occurrence of the typographical error and a typographical error correction function for correcting the typographical error based on the touch data. A keyboard layout of the virtual keyboard displayed in the second display area may be changeable. Accordingly, when at least two input key values are simultaneously input in the keyboard mode, the foldable display device may notify the occurrence of the typographical error and correct the typographical error. In other words, when the virtual keyboard is used, the occurrence of the typographical error may be effectively reduced. In addition, the foldable display device may change the layout of the virtual keyboard in the keyboard mode. In other words, a convenience of using the virtual keyboard may be effectively increased. Since these are described above, duplicated description related thereto will not be repeated.

The present disclosure may be applied to a display device including a foldable display panel and an electronic device including the display device. For example, the present disclosure may be applied to a cellular phone, a smart phone, a personal computer ("PC"), a tablet PC, a laptop, a television ("TV"), a digital TV, a three-dimensional ("3D") TV, a home appliance, a personal digital assistant ("PDA"), a portable multimedia player ("PMP"), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A foldable display device comprising:
    a foldable display panel including a folding line, a first display area disposed on a first side of the folding line, and a second display area disposed on a second side of the folding line, wherein the second display area displays a virtual keyboard including virtual keys when operating in a keyboard mode;
    a touch panel including a plurality of touch electrodes and which receives a touch input by using the touch electrodes;
    a data driver which outputs a data voltage to the foldable display panel;
    a driving controller which controls the data driver; and
    a touch data generator which generates touch data for input key values based on the touch input, determines at least two input key values of the input key values as a typographical error when the at least two input key values are simultaneously input, and outputs the touch data including the at least two input key values determined as the typographical error to the driving controller,
    wherein the driving controller activates a typographical error notification function for notifying occurrence of the typographical error and a typographical error correction function for correcting the typographical error based on the touch data,
    wherein, when the typographical error notification function is activated, the second display area of the foldable display panel changes a color of an entirety of the virtual keyboard displayed therein.

2. The foldable display device of claim 1, wherein, when at least two of the virtual keys on the virtual keyboard are consecutively touched within a pre-stored reference input time, the touch data generator determines that at least two input key values corresponding to the at least two of the virtual keys, respectively, are simultaneously input.

3. The foldable display device of claim 1, wherein, when the typographical error notification function is activated, the first display area of the foldable display panel displays a character-type message for notifying the occurrence of the typographical error.

4. The foldable display device of claim 1, wherein, when the typographical error notification function is activated, a warning sound or a vibration for notifying the occurrence of the typographical error is output.

5. The foldable display device of claim 4, wherein the driving controller is wirelessly connected to a wearable device, and
    wherein the wearable device outputs the warning sound or the vibration for notifying the occurrence of the typographical error.

6. The foldable display device of claim 1, wherein, when the typographical error correction function is activated, the touch data generator determines an input key value corresponding to a virtual key having a greatest touch intensity among the at least two input key values that are simultaneously input as a correct input and generates the touch data based on the correct input.

7. The foldable display device of claim 6, wherein the touch intensity is calculated based on a pressure of the touch input, a position of the touch input, and a time of the touch input to a corresponding virtual key.

8. A foldable display device comprising:
    a foldable display panel including a folding line, a first display area disposed on a first side of the folding line, and a second display area disposed on a second side of the folding line, wherein the second display area displays a virtual keyboard including virtual keys when operating in a keyboard mode;
    a touch panel including a plurality of touch electrodes and which receives a touch input by using the touch electrodes;
    a data driver which outputs a data voltage to the foldable display panel;
    a driving controller which controls the data driver; and
    a touch data generator which generates touch data for input key values based on the touch input and outputs the touch data to the driving controller,
    wherein a keyboard layout of the virtual keyboard displayed in the second display area is changeable, wherein the driving controller activated a typographical error notification function for notifying occurrence of the typographical error based on the touch data, and wherein, when the typographical error notification function is activated, a vibration for notifying the occurrence of the typographical error is output.

9. The foldable display device of claim 8, wherein the keyboard layout includes a first keyboard length, a second keyboard length, a third keyboard length, and a fourth keyboard length, which determine a size of the virtual keyboard, wherein the first keyboard length is a length of the virtual keyboard in a vertical direction, wherein the second keyboard length is a length of the virtual keyboard in a horizontal direction, wherein the third keyboard length is a length of a width of each of the virtual keys included in the virtual keyboard, and wherein the fourth keyboard length is a length of a gap between two adjacent virtual keys of the virtual keys included in the virtual keyboard.

10. The foldable display device of claim 9, wherein the first keyboard length includes a first-first keyboard length and a first-second keyboard length, wherein the first-first keyboard length is a length between the folding line and an uppermost end of the virtual keyboard, and wherein the first-second keyboard length is a length between the uppermost end of the virtual keyboard and a lowermost end of the virtual keyboard.

11. The foldable display device of claim 9, wherein the second keyboard length includes a second-first keyboard length and a second-second keyboard length, wherein the second-first keyboard length is a length between a left edge of the foldable display panel and a left edge of the virtual keyboard, and wherein the second-second keyboard length is a length between the left edge of the virtual keyboard and a right edge of the virtual keyboard.

12. The foldable display device of claim 9, wherein each of the first keyboard length, the second keyboard length, the third keyboard length, and the fourth keyboard length is changed based on a user setting.

13. The foldable display device of claim 9, wherein the touch data generator determines at least two input key values of the input key values as a typographical error when the at least two input key values are simultaneously input and outputs the touch data including the at least two input key values determined as the typographical error to the driving controller, wherein the driving controller generates accumulated typographical error data by accumulating the at least two input key values determined as the typographical error included in the touch data, and wherein the driving controller changes at least one of the first keyboard length, the second keyboard length, the third keyboard length, and the fourth keyboard length based on the accumulated typographical error data.

14. The foldable display device of claim 13, wherein the driving controller activates a typographical error notification function for notifying occurrence of the typographical error based on the touch data, and wherein, when the typographical error notification function is activated, the first display area of the foldable display panel displays a character-type message for notifying the occurrence of the typographical error.

15. The foldable display device of claim 13, wherein the driving controller activates a typographical error notification function for notifying occurrence of the typographical error based on the touch data, and wherein, when the typographical error notification function is activated, the second display area of the foldable display panel changes a color of the virtual keyboard displayed therein.

16. The foldable display device of claim 13, wherein the driving controller activates a typographical error correction function for correcting the typographical error based on the touch data, and wherein, when the typographical error correction function is activated, the touch data generator determines an input key value corresponding to a virtual key having a greatest touch intensity among the at least two input key values that are simultaneously input as a correct input and generates the touch data based on the correct input.

17. A method of driving a foldable display device, the method comprising:

displaying an image in a first display area disposed on a first side of a folding line of a foldable display panel;

displaying a virtual keyboard including virtual keys in a second display area disposed on a second side of the folding line of the foldable display panel;

receiving a touch input for the virtual keyboard by using touch electrodes;

generating touch data for input key values based on the touch input; and determining at least two input key values of the input key values as a typographical error when the at least two input key values are simultaneously input; and wherein a keyboard layout of the virtual keyboard displayed in the second display area is changeable, wherein the keyboard layout includes a first keyboard length, a second keyboard length, a third keyboard length, and a fourth keyboard length, which determine a size of the virtual keyboard, wherein the first keyboard length is a length of the virtual keyboard in a vertical direction, wherein the second keyboard length is a length of the virtual keyboard in a horizontal direction, wherein the third keyboard length is a length of a width of each of the virtual keys included in the virtual keyboard, and wherein the fourth keyboard length is a length of a gap between two adjacent virtual keys of the virtual keys included in the virtual keyboard, wherein accumulated typographical error data is generated by accumulating the at least two input key values determined as the typographical error included in the touch data.

18. The method of claim 17, further comprising:

activating a typographical error notification function for notifying occurrence of the typographical error and a typographical error correction function for correcting the typographical error, wherein, when the typographical error notification function is activated, the first display area displays a character-type message for notifying the occurrence of the typographical error, and wherein, when the typographical error correction function is activated, an input key value corresponding to a virtual key having a greatest touch intensity among the at least two input key values that are simultaneously input is determined as a correct input, and the touch data is generated based on the correct input.

\* \* \* \* \*